US007827225B2

(12) United States Patent
Balakrishnan et al.

(10) Patent No.: US 7,827,225 B2
(45) Date of Patent: Nov. 2, 2010

(54) METHODS AND SYSTEMS FOR A MULTI-CHANNEL FAST FOURIER TRANSFORM (FFT)

(75) Inventors: Jaiganesh Balakrishnan, Karnataka (IN); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1306 days.

(21) Appl. No.: 11/336,459

(22) Filed: Jan. 20, 2006

(65) Prior Publication Data

US 2006/0167964 A1    Jul. 27, 2006

Related U.S. Application Data

(60) Provisional application No. 60/645,876, filed on Jan. 21, 2005.

(51) Int. Cl.
*G06F 17/14* (2006.01)

(52) U.S. Cl. ............................................. 708/404

(58) Field of Classification Search .......... 708/400–409
See application file for complete search history.

(56) References Cited

U.S. PATENT DOCUMENTS

| 5,694,347 | A | * | 12/1997 | Ireland | 708/404 |
| 6,917,955 | B1 | * | 7/2005 | Botchev | 708/406 |
| 7,552,161 | B2 | * | 6/2009 | Schwoerer et al. | 708/404 |

* cited by examiner

*Primary Examiner*—Tan V Mai
(74) *Attorney, Agent, or Firm*—Steven A. Shaw; W. James Brady; Frederick J. Telecky, Jr.

(57) ABSTRACT

In at least some embodiments, a method is provided. The method includes receiving samples from a first input channel and a second input channel. The method further includes controlling commutators to selectively switch samples between the first and second input channels for input to a radix-2 butterfly. The method further includes continuously activating the radix-2 butterfly while processing samples received from the first input channel followed by samples received from the second input channel.

22 Claims, 5 Drawing Sheets

METHODS AND SYSTEMS FOR A MULTI-CHANNEL FAST FOURIER TRANSFORM (FFT)

CROSS-REFERENCE TO RELATED APPLICATIONS

This application is a non-provisional application claiming priority to U.S. Pat. App. Ser. No. 60/645,876, entitled "Efficient Implementation of a Multi-Channel FFT", filed on Jan. 21, 2005. The above-referenced application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communication systems, and more particularly, but not by way of limitation, to communication systems that implement fast Fourier transforms (FFT).

BACKGROUND

In order for electronic devices to communicate, a wireless or wired protocol (i.e., standard) defines hardware and software parameters that enable the devices to send, receive, and interpret data. Frequency division multiplexing or frequency division modulation (FDM) is a technology that transmits multiple signals simultaneously over a single transmission path, such as a cable or wireless system. Each signal travels within its own unique frequency range (carrier), which is modulated by data (e.g., text, voice, video, etc.).

Orthogonal FDM (OFDM) distributes the data over a large number of carriers that are spaced apart at precise frequencies. Recently, multi-input multi-output (MIMO) OFDM systems are gaining popularity. In either OFDM or MIMO OFDM systems, each OFDM transceiver implements Fast Fourier Transform (FFT) logic to extract frequency spectrum data from the incoming signal samples. Implementing a FFT contributes significant complexity to an OFDM transceiver. For example, in a 2×2 MIMO OFDM system, a straight-forward FFT implementation (i.e., using separate FFT components for each input/output) would double the gate count of the FFT logic.

SUMMARY

In at least some embodiments, a system comprises a Fast Fourier Transform (FFT) pipeline that comprises a plurality of radix-2 butterfly components, each radix-2 butterfly component having two inputs and two outputs. The system further comprises a plurality of commutators, each radix-2 butterfly component being associated with one of the commutators. Each radix-2 butterfly component and its associated commutator are controlled to enable each radix-2 butterfly component to be continuously active while processing in succession a first symbol received from a first channel and a second symbol received from a second channel According to another embodiment, a receiver comprises Fast Fourier Transform (FFT) logic having a plurality of radix-2 butterflies and multipliers. The receiver also comprises a frequency equalizer. The FFT logic is configured to receive samples from two input channels and to maintain at least one of the radix-2 butterflies and at least one of the multipliers in an active state while processing samples received from a first input channel followed by samples received from a second input channel According to other embodiments, a method is provided that includes receiving samples from a first input channel and a second input channel. The method further includes controlling commutators to selectively switch samples between the first and second input channels for input to a radix-2 butterfly. The method further includes continuously activating the radix-2 butterfly while processing samples received from the first input channel followed by samples received from the second input channel.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Electronic devices that communicate wirelessly (or via a wired connection) implement a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes.

If data communication is wireless, one or more antennas "pick up" the wireless signal, after which data is recovered by sampling the received signal and decoding each information symbol. To recover data, a receiving device may implement techniques such as signal amplification, digitization, sample rate conversion, Fast Fourier Transform (FFT) processing, equalization, demodulation, de-interleaving, de-coding, and/or de-scrambling.

There are many techniques to perform FFT processing. In at least some embodiments, FFT processing is performed based on a radix-2 pipelined architecture that increases utilization of the add/subtract butterflies and the multipliers compared to a 1×1 radix-2 pipelined architecture. The novel radix-2 pipelined architecture can be implemented in a 2×2 multi-input multi-output (MIMO) Orthogonal Frequency Division Multiplexing (OFDM) system. Also, other embodiments are possible as described herein and others which will readily suggest themselves to one skilled in the art.

Figure 1:
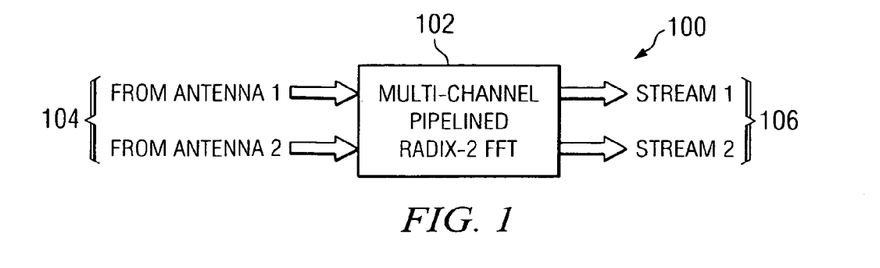
FIG. 1 illustrates a Fast Fourier Transform (FFT) module in accordance with embodiments of the disclosure.

FIG. 1 illustrates a Fast Fourier Transform (FFT) module 100 in accordance with embodiments of the disclosure. In FIG. 1, the FFT module 100 comprises a multi-channel pipelined radix-2 FFT. As shown, the FFT module 110 receives multiple inputs 104. For example, the multiple inputs 104 may be received from multiple antennas ("Antenna 1" and "Antenna 2"). The FFT module 110 performs FFT processing for each of the inputs 104 and provides multiple outputs 106 (e.g., "Stream 1" and "Stream 2"). The outputs 106 provide frequency spectrum data related to the inputs 104 (e.g., Stream 1 is related to the input from Antenna 1, Stream 2 is related to the input from Antenna 2 and so on).

Figure 2A:
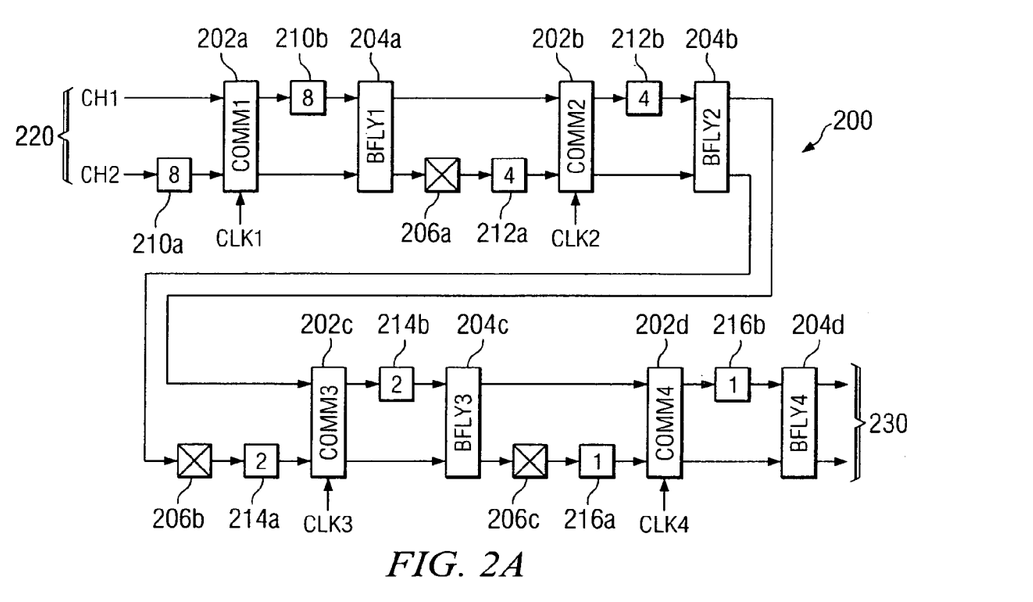
FIGS. 2A-2C illustrate a pipelined decimation-in-frequency FFT architecture in accordance with embodiments of the disclosure.
Figure 2B:
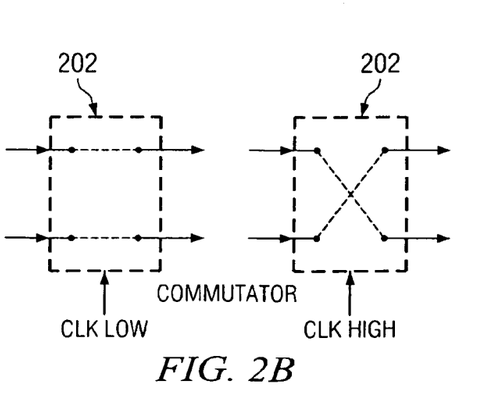
Figure 2C:
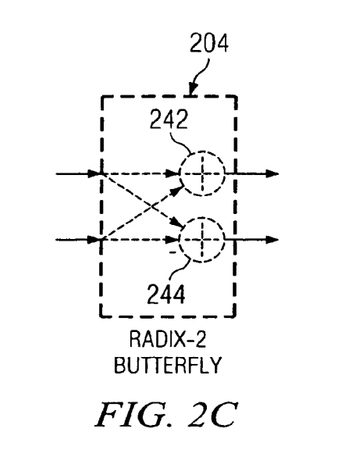

FIGS. 2A-2C illustrate a 16-point pipelined decimation-in-frequency FFT architecture 200 in accordance with embodiments of the disclosure. The pipelined decimation-in-frequency FFT architecture 200 can be used in a 2×2 MIMO OFDM system. For illustrative purposes, the OFDM system that implements the pipelined decimation-in-frequency FFT architecture 200 is assumed to have a ¼ cyclic prefix duration (e.g., if each symbol corresponds to 16 samples, the ¼ cyclic prefix duration corresponds to 4 samples). As shown in FIG. 2A, the pipelined decimation-in-frequency FFT architecture 200 comprises a plurality of commutators 202A-202D.

As shown in FIG. 2B, a commutator 202 functions as a switch. If a clock signal input to the commutator 202 is low, the commutator 202 forwards data directly. Alternatively, if a clock signal input to the commutator 202 is high, the commutator 202 switches data from one channel to the other and vice versa. For example, if the CLK1 input to the commutator 202A is low, the samples received from the channels "CH1" and "CH2" would be forwarded directly (i.e., samples received from CH1 are directly forwarded to the top output and samples received from CH2 are directly forwarded to the bottom output). Alternatively, if the CLK1 input to the commutator 202A is high, the samples received from the channels CH1 and CH2 are switched (i.e., samples received from CH1 are switched to the bottom output and samples received from CH2 are switched to the top output).

As shown in FIG. 2A, the bottom input and the top output of each commutator couples to a buffer. For example, the bottom input of the commutator 202A couples to an 8-sample buffer 210A and the top output of the commutator 202A couples to an 8-sample buffer 210B. Likewise, the bottom input of the commutator 202B couples to a 4-sample buffer 212A and the top output of the commutator 202B couples to a 4-sample buffer 212B. The bottom input of the commutator 202C couples to a 2-sample buffer 214A and the top output of the commutator 202C couples to a 2-sample buffer 214B. Finally, the bottom input of the commutator 202D couples to a 1-sample buffer 216A and the top output of the commutator 202D couples to a 1-sample buffer 216B.

The pipelined decimation-in-frequency FFT architecture 200 also comprises a plurality of radix-2 butterflies 204A-204D. As shown in FIG. 2C, a radix-2 butterfly 204 receives two inputs. The radix-2 butterfly 204 implements adding logic 242 that adds the two inputs to provide an "added" output (the top output) and subtracting logic 244 that subtracts one input from the other to provide a "subtracted" output (the bottom output).

As shown, the added (top) output of each radix-2 butterfly (except the butterfly 204D) is forwarded to the next commutator. For example, the top output of the radix-2 butterfly 204A is forwarded to the commutator 202B, the top output of the radix-2 butterfly 204B is forwarded to the commutator 202C, and the top output of the radix-2 butterfly 204C is forwarded to the commutator 202D. The top output of the radix-2 butterfly 204D is provided as an output 230 for the pipelined decimation-in-frequency FFT architecture 200.

The subtracted (bottom) output for each radix-2 butterfly (except the butterfly 204D) is forwarded to a multiplier. For example, the bottom output of the radix-2 butterfly 204A is forwarded to the multiplier 206A, the bottom output of the radix-2 butterfly 204B is forwarded to the multiplier 206B, and the bottom output of the radix-2 butterfly 204C is forwarded to the multiplier 206C. The bottom output of the radix-2 butterfly 204D is provided as an output 230 for the FFT.

Each of the multipliers 206A-206C is associated with one or more twiddle factors that are repeated in a predetermined cycle. In some embodiments, the multiplier 206A is associated with the twiddle factors: $W_{16}^0, W_{16}^1, W_{16}^2, W_{16}^3, W_{16}^4, W_{16}^5, W_{16}^6, W_{16}^7$. Also, the multiplier 206B is associated with the twiddle factors: $W_{16}^0, W_{16}^2, W_{16}^4, W_{16}^6$. Finally, the multiplier 206C is associated with the twiddle factors: $W_{16}^0, W_{16}^4$.

The output of each multiplier is input to a buffer. As shown, the output of the multiplier 206A is input to the 4-sample buffer 212A, the output of the multiplier 206B is input to the 2-sample buffer 214A and the output of the multiplier 206C is input to the 1-sample buffer 216A.

In at least some embodiments, the input 220 to the pipelined decimation-in-frequency FFT architecture 200 is in linear order with two input samples every clock cycle (one for each channel). The output 230 of the pipelined decimation-in-frequency FFT architecture 200 is two samples every clock cycle with bit-reversed order for the CH1 output followed by bit-reversed order for the CH2 output. The bit reversed order for CH1 samples and CH2 samples is accomplished by processing the samples through the radix-2 butterflies 204A-

204D and by timing the switching of the commutators 202A-202D using clock signals (CLK1-CLK4).

For the pipelined decimation-in-frequency FFT architecture 200, the CLK1 signal directs the commutator 202A to flip once every 8 clock periods while the radix-2 butterfly 204A processes samples. The CLK2 signal directs the commutator 202B to flip once every 4 clock periods while the radix-2 butterfly 204B processes samples. The CLK3 signal directs the commutator 202C to flip once every 2 clock periods while the radix-2 butterfly 204C processes samples. The CLK4 signal directs the commutator 202D to flip once every clock period while the radix-2 butterfly 204D processes samples.

Figure 3A:
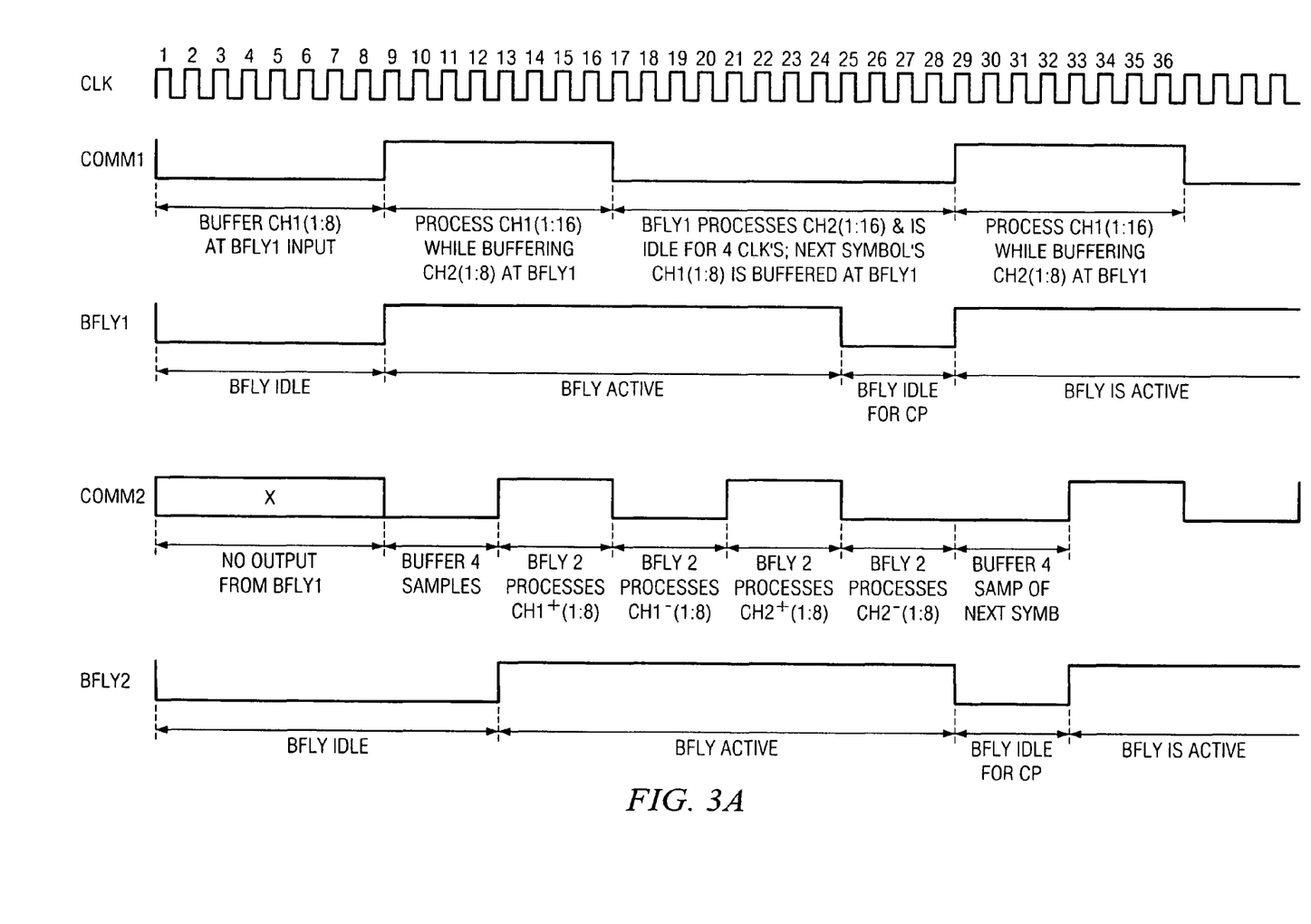
FIGS. 3A-3B illustrate timing diagrams for the pipelined decimation-in-frequency FFT architecture of FIGS. 2A-2C in accordance with embodiments of the disclosure.
Figure 3B:
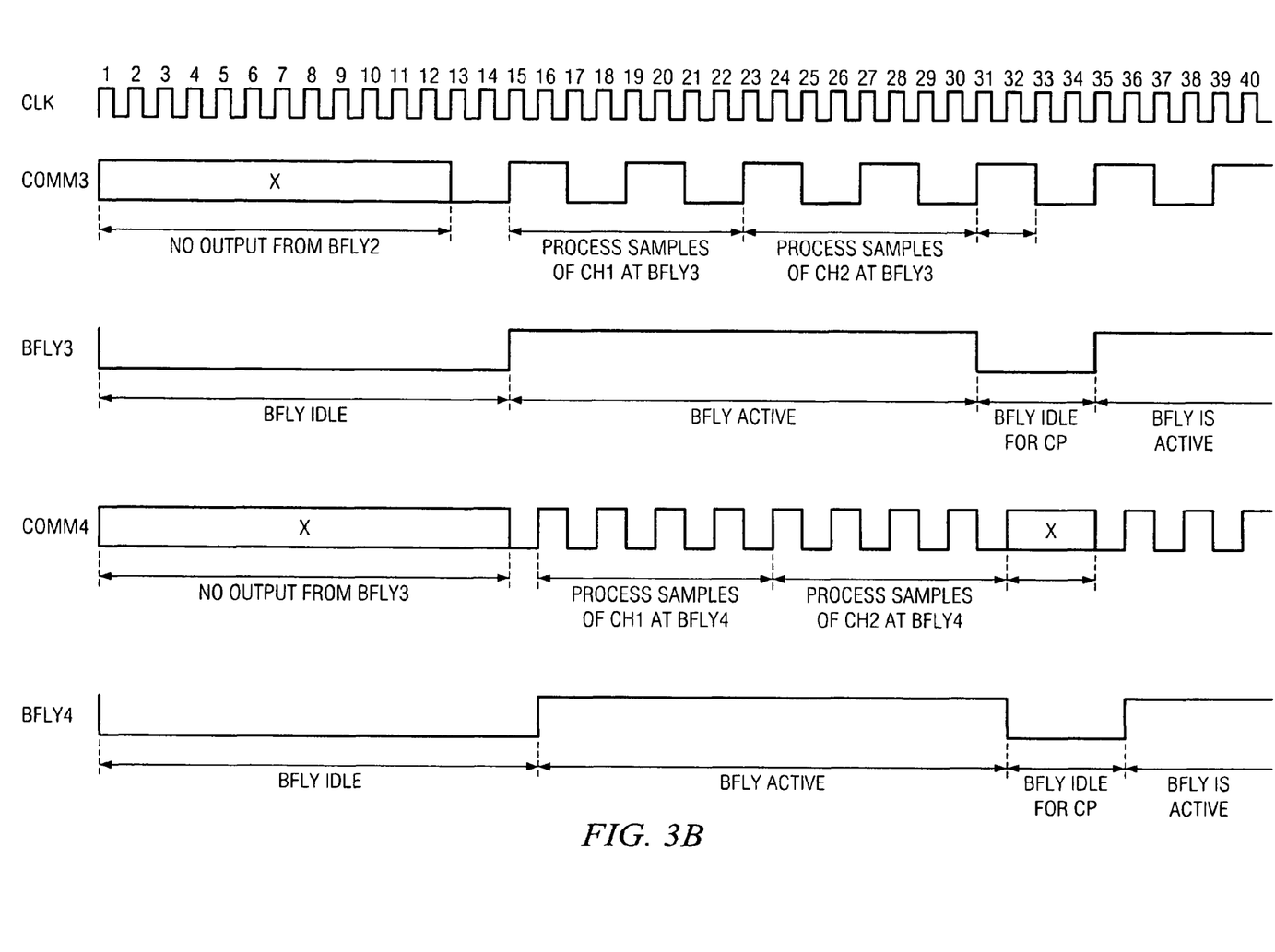

FIGS. 3A-3B illustrate timing diagrams for the pipelined decimation-in-frequency FFT architecture of FIGS. 2A-2C in accordance with embodiments of the disclosure. In FIG. 3A are shown the control signal ("COMM1") for the commutator 202A and the control signal ("BFLY1") for the radix-2 butterfly 204A.

The control signals COMM1 and BFLY1 are described with respect to clock periods (1-36) of a clock control signal ("CLK"). During clock periods 1-8, the COMM1 signal is "low," causing the samples 1:8 of CH1 to be forwarded by the commutator 202A and buffered by the 8-bit buffer 210B while samples 1:8 of CH2 are buffered by the 8-bit buffer 210A. During clock periods 1-8, the BFLY1 signal is also low, causing the radix-2 butterfly 204A to be idle.

During clock periods 9-16, the COMM1 and BFLY1 signals are "high," causing samples 1:8 of CH2 to be buffered by the 8-sample buffer 210B while the radix-2 butterfly 204A processes samples 1:16 received from CH1 (samples 1:8 are received at the top input of the radix-2 butterfly 204A and samples 9:16 are received at the bottom input of the radix-2 butterfly 204A). During clock periods 17-28, the COMM1 signal is low, causing the cyclic prefix and the next 8 samples of the next symbol from CH1 to be buffered by the 8-sample buffer 210B. Also, during clock periods 17-24 the BFLY1 signal is high, causing the radix-2 butterfly 204A to process samples 1:16 received from CH2 (samples 1:8 are received at the top input of the radix-2 butterfly 204A and samples 9:16 are received at the bottom input of the radix-2 butterfly 204A. During clock periods 25-28, the 4 samples corresponding to the cyclic prefix of the next symbol are dumped out of the 8-sample buffer 210B so that only symbol samples are processed through the remaining components of the pipelined decimation-in-frequency FFT architecture 200. Starting with clock period 29, the process described for clock periods 9-28 is repeated again for the next symbols received from CH1 and CH2

FIG. 3A also shows the control signal ("COMM2") for the commutator 202B and the control signal ("BFLY2") for the radix-2 butterfly 204B. Similar to the control signals COMM1 and BFLY1, the control signals COMM2 and BFLY2 are described with respect to clock periods (e.g., clock periods 1-29) of the clock control signal ("CLK").

During clock periods 1-8, the COMM2 signal is irrelevant as there is no output from the radix-2 butterfly 204A. During clock periods 9-12, the COMM2 signal is low, causing 4 samples from the top output (added samples) of the radix-2 butterfly 204A to be buffered by the 4-sample buffer 212B. Samples from the bottom output (subtracted samples) of the radix-2 butterfly 204A pass though the multiplier 206A and the 4-sample buffer 212A.

During clock periods 1-12 the BFLY2 signal is low, causing the radix-2 butterfly 204B to be idle. During clock periods 13-16, the COMM2 and BFLY2 signals are high, causing the added CH1 samples from the radix-2 butterfly 204A (added samples 1:8) to be processed by the radix-2 butterfly 204B (added samples 1:4 are received at the top input of the radix-2 butterfly 204B and added samples 5:8 are received at the bottom input of the radix-2 butterfly 204B). During clock periods 17-20, the COMM2 signal is low and the BFLY2 signal is high, causing subtracted CH1 samples from the radix-2 butterfly 204A (subtracted samples 1:8) to be processed by the radix-2 butterfly 204B (subtracted samples 1:4 are received at the top input of the radix-2 butterfly 204B and subtracted samples 5:8 are received at the bottom input of the radix-2 butterfly 204B).

During clock periods 21-24, the COMM2 and BFLY2 signals are high, causing added CH2 samples from the radix-2 butterfly 204A (added samples 1:8) to be processed by the radix-2 butterfly 204B (added samples 1:4 are received at the top input of the radix-2 butterfly 204B and added samples 5:8 are received at the bottom input of the radix-2 butterfly 204B). During clock periods 25-28, the COMM2 signal is low and the BFLY2 signal is high, causing subtracted CH2 samples from the radix-2 butterfly 204A (subtracted samples 1:8) to be processed by the radix-2 butterfly 204B (subtracted samples 1:4 are received at the top input of the radix-2 butterfly 204B and subtracted samples 5:8 are received at the bottom input of the radix-2 butterfly 204B). Starting with clock period 29, the process described for clock periods 9-28 is repeated again for the next symbols received from CH1 and CH2.

FIG. 3B shows the control signal ("COMM3") for the commutator 202C and the control signal ("BFLY3") for the radix-2 butterfly 204C. Similar to the control signals previously described, the control signals COMM3 and BFLY3 are described with respect to clock periods (e.g., clock periods 1-40) of the clock control signal ("CLK").

During clock periods 1-12, the COMM3 signal is irrelevant as there is no output from the radix-2 butterfly 204B. During clock periods 13-14, the COMM3 signal is low, causing 2 samples from the top output (added samples) of the radix-2 butterfly 204B to be buffered by the 2-sample buffer 214B. Samples from the bottom output (subtracted samples) of the radix-2 butterfly 204B pass though the multiplier 206B and the 2-sample buffer 214A.

During clock periods 1-14, the BFLY3 signal is low, causing the radix-2 butterfly 204C to be idle. During clock periods 15-22, the COMM3 signal alternates (between high and low) every 2 clock periods while the BFLY3 signal is high to enable the radix-2 butterfly 204C to process the CH1 samples received from the radix-2 butterfly 204B. During clock periods 23-30, the COMM3 signal continues to alternate (between high and low) every 2 clock periods while the BFLY3 signal is high to enable the radix-2 butterfly 204C to process the CH2 samples received the radix-2 butterfly 204B. During clock periods 31-34, the BFLY3 signal is low, causing the radix-2 butterfly 204C to be idle for the cyclic prefix (CP) duration associated with the next symbol. Starting with clock period 33, the process described for clock periods 13-30 is repeated again for the next symbols received from CH1 and CH2.

FIG. 3B also shows the control signal ("COMM4") for the commutator 202D and the control signal ("BFLY4") for the radix-2 butterfly 204D. Similar to the control signals previously described, the control signals COMM4 and BFLY4 are described with respect to clock periods (e.g., clock periods 1-40) of the clock control signal ("CLK").

During clock periods 1-14, the COMM4 signal is irrelevant as there is no output from the radix-2 butterfly 204C. During clock period 15, the COMM4 signal is low, causing 1 sample from the top output (an added sample) of the radix-2 butterfly 204C to be buffered by the 1-sample buffer 216B. Samples from the bottom output (subtracted samples) of the radix-2 butterfly 204C pass though the multiplier 206C and the 1-sample buffer 216A.

During clock periods 1-15, the BFLY4 signal is low, causing the radix-2 butterfly 204D to be idle. During clock periods 16-23, the COMM4 signal alternates (between high and low) every clock period while the BFLY4 signal is high to enable the radix-2 butterfly 204D to process the CH1 samples received from the radix-2 butterfly 204C. During clock periods 24-31, the COMM4 signal continues to alternate (between high and low) every clock period while the BFLY4 signal is high to enable the radix-2 butterfly 204D to process the CH2 samples received radix-2 butterfly 204C. During clock periods 32-34, the COMM4 signal is irrelevant as there is no output from the radix-2 butterfly 204C. Also, the BFLY3 signal is low, causing the radix-2 butterfly 204D to be idle for the cyclic prefix (CP) duration associated with the next symbol. Starting with clock period 35, the process described for clock periods 15-31 is repeated again for the next symbols received from CH1 and CH2.

Although the pipelined decimation-in-frequency FFT architecture 200 was illustrated for a 16-point FFT, other embodiments may be used and will suggest themselves to one skilled in the art. The complexity of the pipelined decimation-in-frequency FFT architecture 200 for an N-point FFT is shown in Table 1 as the "Proposed Two-Channel Radix-2 Architecture". Table 1 shows FFT architectures that implement two channels for processing.

TABLE 1

| Architecture Name | # Multipliers | # Adders | Memory | Control |
|---|---|---|---|---|
| Radix-2 Multi-path Delay Commutator | $4(\log_4 N-1)$ | $8\log_4 N$ | $3N-4$ | Simple |
| Radix-4 Multi-Path Delay Commutator | $6(\log_4 N-1)$ | $16\log_4 N$ | $5N-8$ | Simple |
| Radix-4 Single-Path Delay Commutator | $2(\log_4 N-1)$ | $6\log_4 N$ | $4(N-1)$ | Complex |
| Radix-2 Single-Path Delay Feedback | $4(\log_4 N-1)$ | $8\log_4 N$ | $2(N-1)$ | Simple |
| Radix-4 Single-Path Delay Feedback | $2(\log_4 N-1)$ | $16\log_4 N$ | $2(N-1)$ | Medium |
| Radix-$2^2$ Single-Path Delay Feedback | $2(\log_4 N-1)$ | $8\log_4 N$ | $2(N-1)$ | Simple |
| Proposed Two-Channel Radix-2 Architecture | $2(\log_4 N-1)$ | $4\log_4 N$ | $2(N-1)$ | Simple |

As shown in Table 1, the Proposed Two-Channel Radix-2 Architecture implements $2(\log_4 N-1)$ multipliers, $4 \log_4 N$ adders, memory to buffer $2(N-1)$ samples and simple control. In some embodiments, at least one of these $2(\log_4 N-1)$ multipliers can be implemented using simplified logic such as shift-and-add logic or sign ("+" or "−") operation logic (e.g., when multiplication is by the value 1 or j). The Proposed Two-Channel Radix-2 Architecture has the least complexity of the architectures shown in Table 1. Again, the 16-point pipelined decimation-in-frequency FFT architecture 200 of FIGS. 2A-2C is an example of the Proposed Two-Channel Radix-2 Architecture. In alternative embodiments, the Proposed Two-Channel Radix-2 Architecture and control method can be extended to a pipelined decimation-in-time FFT architecture, a high-speed parallelized FFT architecture, or a "folded" multi-channel FFT architecture.

Figure 4A:
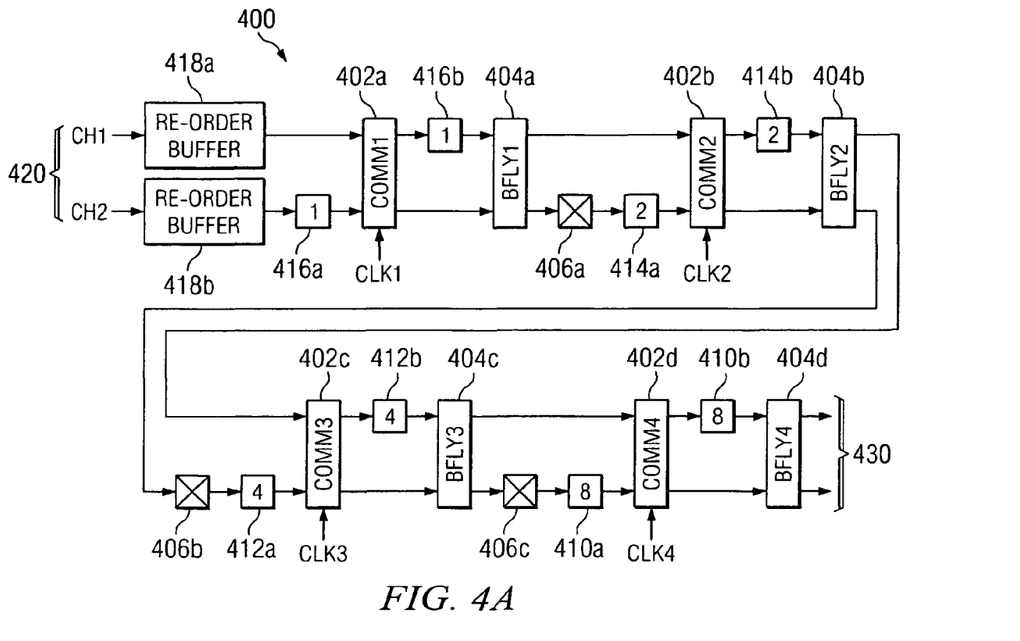
FIGS. 4A-4C illustrate a pipelined decimation-in-time FFT architecture in accordance with embodiments of the disclosure.
Figure 4B:
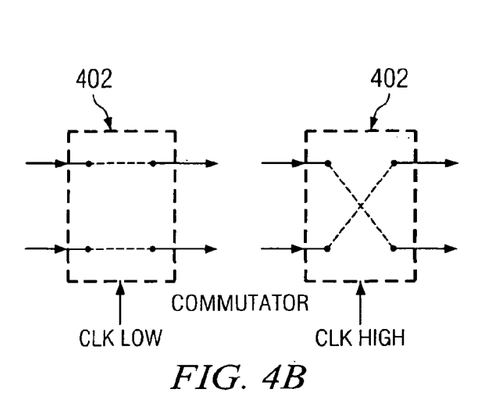
Figure 4C:
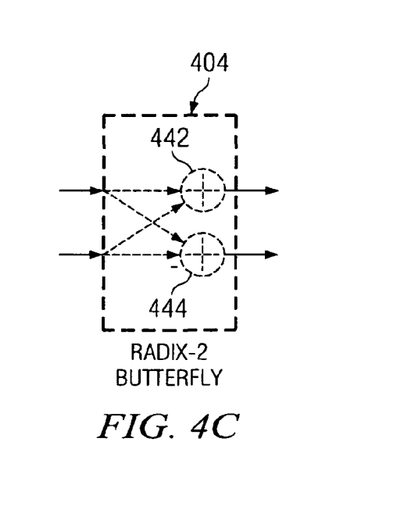

FIGS. 4A-4C illustrate a 16-point pipelined decimation-in-time FFT architecture 400 in accordance with embodiments of the disclosure. In some embodiments, the pipelined decimation-in-time FFT architecture 400 is used in a 2×2 MIMO OFDM system. As shown in FIG. 4A, the pipelined decimation-in-time FFT architecture 400 comprises a plurality of commutators 402A-402D.

As explained previously for the commutator 202 of FIG. 2B, the commutator 402 of FIG. 4B functions as a switch. If a clock signal input to the commutator 402 is low, the commutator 402 forwards data directly. Alternatively, if a clock signal input to the commutator 402 is high, the commutator 402 switches data from one channel to the other and vice versa.

As shown in FIG. 4A, the bottom input and the top output of each commutator couples to a buffer. For example, the bottom input of the commutator 402A couples to a 1-sample buffer 416A and the top output of the commutator 402A couples to a 1-sample buffer 416B. Likewise, the bottom input of the commutator 402B couples to a 2-sample buffer 414A and the top output of the commutator 402B couples to a 2-sample buffer 414B. The bottom input of the commutator 402C couples to a 4-sample buffer 412A and the top output of the commutator 402C couples to a 4-sample buffer 412B. Finally, the bottom input of the commutator 402D couples to an 8-sample buffer 410A and the top output of the commutator 402D couples to an 8-sample buffer 410B.

The pipelined decimation-in-time FFT architecture 400 also comprises a plurality of radix-2 butterflies 404A-404D. As explained previously for the radix-2 butterfly 204 of FIG. 2C, the radix-2 butterfly 404 of FIG. 4C receives two inputs. The radix-2 butterfly 404 implements adding logic 442 that adds the two inputs to provide an "added" output (the top output) and subtracting logic 444 that subtracts one input from the other to provide a "subtracted" output (the bottom output).

As shown, the added (top) output of each radix-2 butterfly (except the butterfly 404D) is forwarded to the next commutator. For example, the top output of the radix-2 butterfly 404A is forwarded to the commutator 402B, the top output of the radix-2 butterfly 404B is forwarded to the commutator 402C, and the top output of the radix-2 butterfly 404C is forwarded to the commutator 402D. The top output of the radix-2 butterfly 404D is provided as an output 430 for the pipelined decimation-in-time FFT architecture 400.

The subtracted (bottom) output for each radix-2 butterfly (except the butterfly 404D) is forwarded to a multiplier. For example, the bottom output of the radix-2 butterfly 404A is forwarded to the multiplier 406A, the bottom output of the radix-2 butterfly 404B is forwarded to the multiplier 406B, and the bottom output of the radix-2 butterfly 404C is forwarded to the multiplier 406C. The bottom output of the radix-2 butterfly 404D is provided as an output 230 for the pipelined decimation-in-time FFT architecture 400.

Each of the multipliers 406A-406C is associated with one or more twiddle factors that are repeated in a predetermined cycle. In some embodiments, the multiplier 406A is associated with the sequence of twiddle factors: $W_{16}^0, W_{16}^0, W_{16}^4, W_{16}^4$. The multiplier 406B is associated with the sequence of twiddle factors: $W_{16}^0, W_{16}^0, W_{16}^2, W_{16}^2, W_{16}^4, W_{16}^4, W_{16}^6, W_{16}^6$. Finally, the multiplier 406C is associated with the sequence of twiddle factors: $W_{16}^0, W_{16}^0, W_{16}^1, W_{16}^1, W_{16}^2, W_{16}^2, W_{16}^3, W_{16}^3, W_{16}^4, W_{16}^4, W_{16}^5, W_{16}^5, W_{16}^6, W_{16}^6,$ $W_{16}{}^7$, $W_{16}{}^7$. As shown, for the pipelined decimation-in-time FFT architecture 400, twiddle factors are repeated twice during each sequence.

The output of each multiplier is input to a buffer. As shown, the output of the multiplier 406A is input to the 2-sample buffer 414A, the output of the multiplier 406B is input to the 4-sample buffer 412A and the output of the multiplier 406C is input to the 8-sample buffer 410A.

In at least some embodiments, the input 420 to the pipelined decimation-in-time FFT architecture 400 is provided in linear order to a re-order buffer 418A (for CH1) and a re-order buffer 418B (for CH2). The re-order buffers 418A and 418B output a bit-reversed order of samples for processing through the remaining components of the pipelined decimation-in-time FFT architecture 400. The output 430 of the pipelined decimation-in-time FFT architecture 400 is in linear order with two CH1 samples during a first clock period followed by two CH2 samples during the next clock period and so on. The linear order for CH1 samples and CH2 samples is accomplished by processing the samples through the radix-2 butterflies 404A-404D and by timing the switching of the commutators 402A-402D using clock signals (CLK1-CLK4).

For the pipelined decimation-in-time FFT architecture 400, the CLK1 signal directs the commutator 402A to flip once every clock period while the radix-2 butterfly 404A processes samples. The CLK2 signal directs the commutator 402B to flip once every 2 clock periods while the radix-2 butterfly 404B processes samples. The CLK3 signal directs the commutator 402C to flip once every 4 clock periods while the radix-2 butterfly 404C processes samples. The CLK4 signal directs the commutator 402D to flip once every 8 clock periods while the radix-2 butterfly 404D processes samples.

Figure 5A:
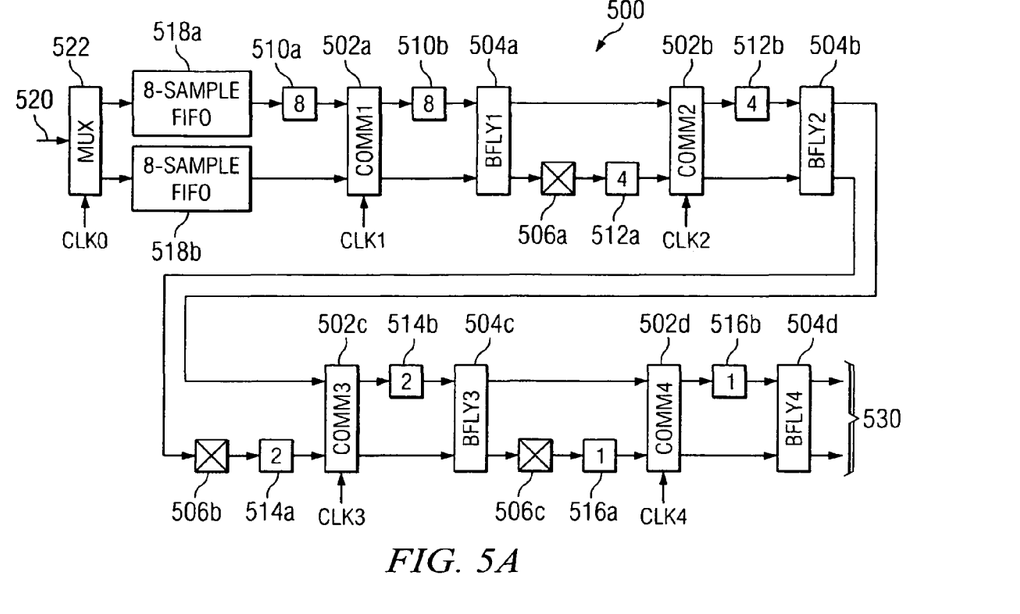
FIGS. 5A-5C illustrate another pipelined decimation-in-frequency FFT architecture in accordance with embodiments of the disclosure.
Figure 5B:
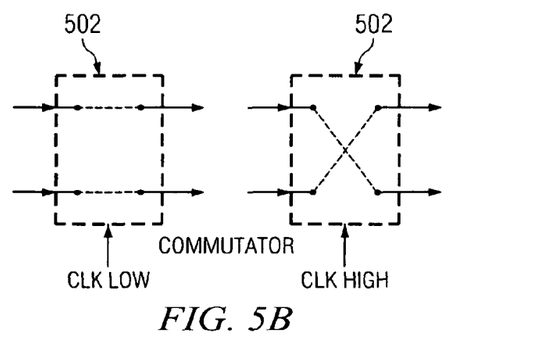
Figure 5C:
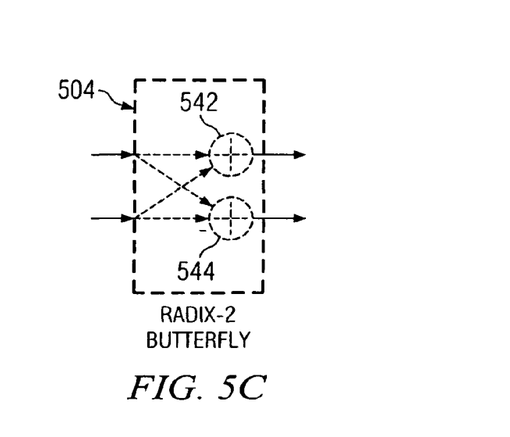

FIGS. 5A-5C illustrate another pipelined decimation-in-frequency FFT architecture 500 in accordance with embodiments of the disclosure. The pipelined decimation-in-frequency FFT architecture 500 can be used in a 1×1 OFDM system to compute two back-to-back OFDM symbols. If desired, the pipelined decimation-in-frequency FFT architecture 500 can be clocked at half the sample rate of the input samples 520.

As shown in FIG. 5A, the pipelined decimation-in-frequency FFT architecture 500 is similar to the pipelined decimation-in-frequency FFT architecture 200 of FIG. 2A. However, in FIG. 5A, the top input of the first commutator (rather than the bottom input as in FIG. 2A) couples to an 8-sample buffer 510A. The pipelined decimation-in-frequency FFT architecture 500 also implements a multiplexer (mux) 522 that forward the input 520 to one of two possible routes (the top route and the bottom route). As shown, an 8-sample first-in first-out (FIFO) buffer 518A receives data output from the mux 522 to the top route and an 8-sample FIFO buffer 518B receives data output from the mux 522 to the bottom route.

In at least some embodiments, the input 520 to the pipelined decimation-in-frequency FFT architecture 500 is in linear order with 1 input sample every clock cycle. The output 530 of the pipelined decimation-in-frequency FFT architecture 500 provides a bit-reversed order of samples for two back-to-back OFDM symbols. The bit reversed order for the back-to-back symbols is accomplished by processing the samples through the radix-2 butterflies 504A-504D and by timing the switching of the commutators 502A-502D using clock signals (CLK1-CLK4) and by clocking the mux 522 and FIFO buffers 518A, 518B appropriately.

For the pipelined decimation-in-frequency FFT architecture 500, the CLK1 signal directs the commutator 502A to flip once every 8 clock periods while the radix-2 butterfly 504A processes samples. The CLK2 signal directs the commutator 502B to flip once every 4 clock periods while the radix-2 butterfly 504B processes samples. The CLK3 signal directs the commutator 502C to flip once every 2 clock periods while the radix-2 butterfly 504C processes samples. The CLK4 signal directs the commutator 502D to flip once every clock period while the radix-2 butterfly 504D processes samples. The mux 522 (e.g., using CLK0) and the FIFO buffers 518A, 518B are clocked at twice the rate of the other components in the pipelined decimation-in-frequency FFT architecture 500.

Figure 6:
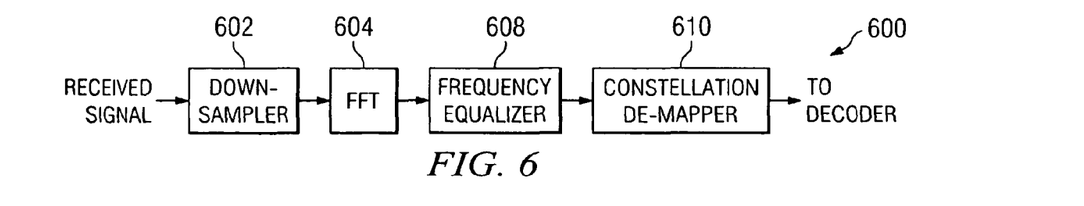
FIG. 6 illustrates a receiver in accordance with embodiments of the disclosure.

FIG. 6 illustrates a receiver 600 in accordance with embodiments of the disclosure. The receiver 600 is not limited to a particular protocol and may be part of any wired or wireless system that receives information symbols. In at least some embodiments, the receiver 600 is part of a MIMO OFDM system. Alternatively, the receiver 600 could be part of a single-input single-output OFDM system.

As shown in FIG. 6, the receiver 600 comprises down-sampler logic 602 that down-samples (decimates) the received signal by a predetermined amount. The down-sampler logic 602 provides samples to the FFT logic 604. The FFT logic 604 extracts frequency spectrum data from the incoming signal samples and outputs the frequency spectrum data to a frequency equalizer 608. In some embodiments, the FFT logic 604 implements the pipelined decimation-in-frequency FFT architecture 200 of FIG. 2A (e.g., in a 2×2 MIMO OFDM system). In alternative embodiments, the FFT logic 604 implements the pipelined decimation-in-time FFT architecture 300 of FIG. 3A (e.g., in a 2×2 MIMO OFDM system). In alternative embodiments, the FFT logic 604 implements the pipelined decimation-in-frequency FFT architecture 500 of FIG. 5A (e.g., in a low power application or a high-speed application where reducing the clock rate of the FFT logic 604 is desirable).

In yet other alternative embodiments, the receiver 600 is used in an ultra-wideband (UWB) application that uses, for example, a 128-point FFT to output 4 samples per clock period. Rather than use four parallel 32-point FFTs (followed by a bank of four multipliers and a 4-point FFT) to output the 4 samples per clock period, the FFT logic 604 can use two 2-channel 32-point FFTs based on the pipelined decimation-in-frequency FFT architecture 200 or pipelined decimation-in-time FFT architecture 300.

The output of the FFT logic 604 is provided to a frequency equalizer 608 which removes interference caused by the communication channel and outputs "equalized" frequency spectrum data to a constellation de-mapper 610. The constellation de-mapper 610 converts the equalized frequency spectrum data to information symbols that can be decoded by a decoder.

Figure 7:
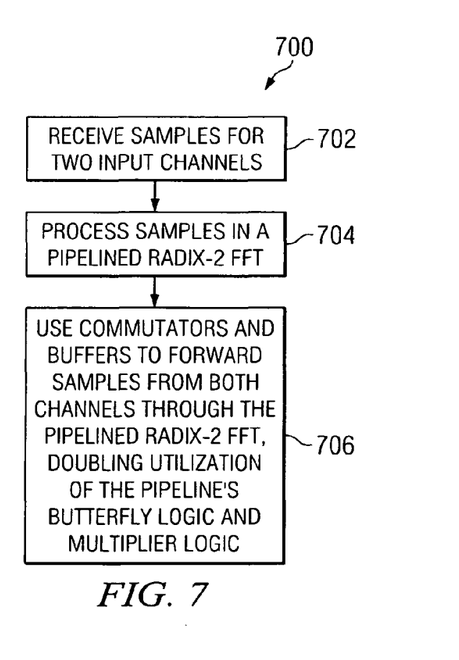
FIG. 7 illustrates a method in accordance with embodiments of the disclosure.

FIG. 7 illustrates a method 700 in accordance with embodiments of the disclosure. As shown in FIG. 7, the method 700 comprises receiving samples for two input channels (block 702). The two input channels can receive samples from multiple antennas or can receive samples from a single antenna (e.g., a multiplexer can distribute samples from a single antenna to the two input channels). At block 704, the method 700 processes samples in a pipelined radix-2 FFT. Finally, commutators and buffers are used to forward samples from both channels through the pipelined radix-2 FFT, doubling utilization of the pipeline's radix-2 butterfly logic and multiplier logic (block 706).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A Fast Fourier Transform (FFT) pipeline, comprising:
   a plurality of radix-2 butterfly components, each radix-2 butterfly component having two inputs and two outputs; and
   a plurality of commutators, each radix-2 butterfly component being associated with one of the commutators,
   wherein each radix-2 butterfly component and its associated commutator are controlled to enable each radix-2 butterfly component to be continuously active while processing in succession a first symbol received from a first channel and a second symbol received from a second channel.

2. The FFT pipeline of claim 1 further comprising buffers located on both an input side and an output side of each commutator.

3. The FFT pipeline of claim 1 further comprising a multiplier associated with one of the radix-2 butterfly components, the multiplier and the associated radix-2 butterfly component being continuously active while processing in succession a first symbol received from a first channel and a second symbol received from a second channel.

4. The FFT pipeline of claim 1 wherein the first and second channels correspond to separate inputs of a multi-input multi-output (MIMO) system.

5. The FFT pipeline of claim 1 further comprising a multiplexer that precedes a first commutator in the pipeline, wherein the multiplexer receives the first and second symbols from a single channel and distributes the first symbol to the first channel and the second symbol to the second channel for processing through the FFT pipeline.

6. The FFT pipeline of claim 5 further comprising first-in first-out (FIFO) buffers coupled between the multiplexer and the first commutator in the pipeline.

7. The FFT pipeline of claim 6 wherein a first clock rate corresponding to the multiplexer and the FIFO buffers is double a second clock rate corresponding to the commutators and radix-2 butterfly components.

8. The FFT pipeline of claim 1, the FFT pipeline corresponding to an N-point FFT having $2(\log_4 N - 1)$ multipliers, $4 \log_4 N$ adders, and buffers for $2(N-1)$ samples.

9. The FFT pipeline of claim 8, wherein at least one of the multipliers is implemented as a shift and add component.

10. The FFT pipeline of claim 8, wherein at least one of the multipliers is implemented as a sign multiplier.

11. A receiver, comprising:
    Fast Fourier Transform (FFT) logic having a plurality of radix-2 butterflies and multipliers; and
    a frequency equalizer, wherein the FFT logic is configured to receive samples from two input channels and to maintain at least one of the radix-2 butterflies and at least one of the multipliers in an active state while processing samples received from a first input channel followed by samples received from a second input channel.

12. The receiver of claim 11 wherein, the FFT logic is implemented based on a pipelined decimation-in-frequency FFT architecture.

13. The receiver of claim 11 wherein the FFT logic is implemented based on a pipelined decimation-in-time FFT architecture.

14. The receiver of claim 13 wherein at least one of the multipliers is associated with a sequence of twiddle factors, each twiddle factor being repeated twice in succession during the sequence.

15. The receiver of claim 11 wherein the FFT logic is used for a 2×2 multi-input multi-output (MIMO) Orthogonal Frequency Division Multiplexing (OFDM) system.

16. The receiver of claim 11 wherein the FFT logic implements a multiplexer that receives samples from a single input channel and selectively distributes the samples to the first and second input channels.

17. The receiver of claim 16 wherein the multiplexer is clocked approximately twice as fast as the radix-2 butterflies and multipliers.

18. The receiver of claim 16 wherein the multiplexer distributes samples of a first symbol to the first input channel and samples of a second symbol to the second input channel.

19. A method, comprising:
    receiving, at a receiver, samples from a first input channel and a second input channel;
    controlling commutators to selectively switch samples between the first and second input channels for input to a radix-2 butterfly; and
    continuously activating the radix-2 butterfly while processing samples received from the first input channel followed by samples received from the second input channel.

20. The method of claim 19 further comprising buffering samples from the first and second input channels for input to the radix-2 butterfly.

21. The method of claim 19 wherein the radix-2 butterfly is continuously active until all samples of a first symbol received from the first input channel and a second symbol received from the second input channel are processed.

22. The method of claim 19 further comprising using a commutator to switch samples between the first and second input channels at least once while the radix-2 butterfly is continuously activated.

* * * * *